Dec. 6, 1938.  L. E. SHICK  2,139,175
METAL DISHCLOTH
Filed March 30, 1937
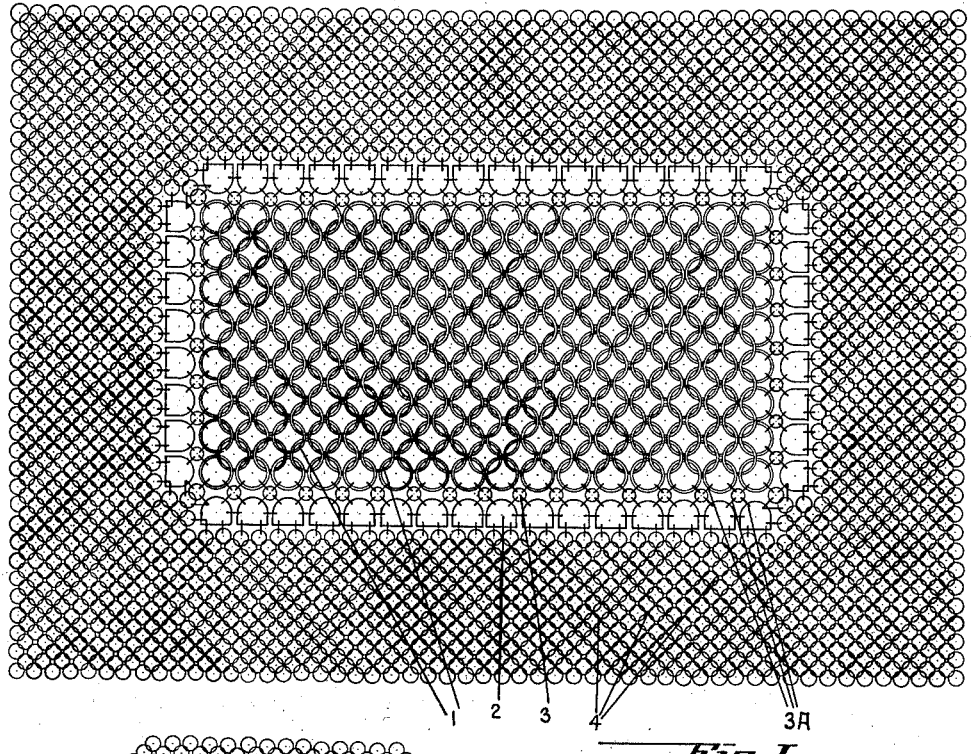
Fig. I
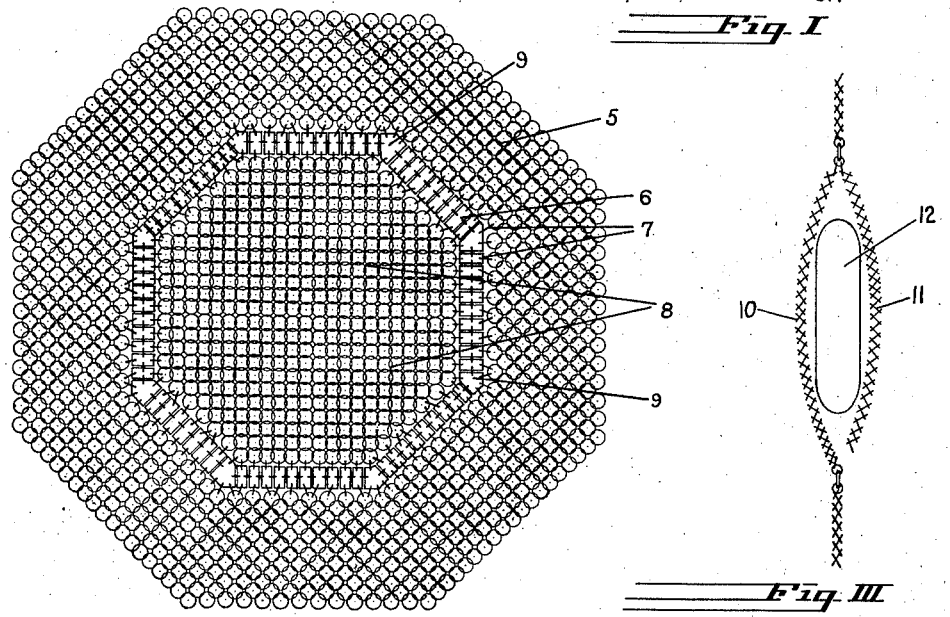
Fig. II
Fig. III
INVENTOR
Lellah E. Shick
BY
ATTORNEY Patented Dec. 6, 1938

2,139,175

UNITED STATES PATENT OFFICE 2,139,175

METAL DISHCLOTH

Lellah E. Shick, Portland, Oreg., assignor of one-half to Matie I. Ivie, Portland, Oreg.

Application March 30, 1937, Serial No. 133,816

2 Claims. (Cl. 15—209)

My invention relates to dishcloths commonly used as a kitchen tool, the object of which is to construct a dishcloth which performs a more undulated and effective scraping service for the cleaning of dishes, pots, pans and kitchen and dining room utensils.

I am aware that heretofore dishcloths have been made of metal woven fabric but these have had inherent difficulties that render them ineffective as a general dish washing implement. In the washing of kitchen and dining room utensils a different kind of cloth is frequently required for the washing of the finer ware than is encountered in the washing of pots, pans, skillets and the like.

In order to make a dishcloth that will be equally satisfactory for both classes of service I have utilized a construction wherein the fabric thus created will have a central portion made of coarse and hardened material that may be exposed as the scraping surface when pots, pans and other kitchen ware are to be cleaned and a fabric that will have a finer, smoother and softer texture that may be utilized in the cleaning and reconditioning of table ware.

The primary object of my invention is to produce a dishcloth that may be used for the dual purpose of cleaning kitchen ware and table ware.

A still further object of my invention is to so construct the device that it may be held in the hand of the dish washer and be utilized with greatest efficiency and with a minimum loss of time.

A further object of my invention consists in providing a dishcloth made of metal fabric so assembled together that a pocket for a scouring and abrasive compound may be formed into which a bar of scouring compound may be placed.

With these and incidental objects in view, the invention consists in certain novel features of construction and combination of parts, the essential elements of which are set forth in the appended claims, and a preferred form of embodiment of which is hereinafter shown with reference to the drawing which accompanies and forms a part of this specification.

In the drawing:

Fig. 1 is a plan view of my new and improved device having a relatively coarse central portion and a relatively fine edge portion.

Fig. 2 is a plan view of a dishcloth having polygonal sides and having a central portion of different construction than the outer rim or edge portion.

Fig. 3 is a side view of a modified form of the mechanism illustrated in Fig. 2. It will be noted in this view that the central portion is made of double thickness in order to form a pocket into which the scouring compound as soap, may be placed and held and locked therein.

Like reference characters refer to like parts throughout the several views.

My new and improved device is made by placing or interlocking a plurality of rings.

In the construction of my device I utilize a central portion made up of relatively large rings 1. This central portion is comprised of parallel sides and ends. I then produce an outer rim portion 4 made up of a plurality of finer rings and I secure the outer portion and the inner portion together by D-shaped links 2 and secure the same to the smaller rings 4 upon the broad surface of the D and secure the D-shaped links together at their ends and secure the large rings 1 to the D-shaped links 2 by rings 3. The rings 3 are secured to the large rings 1 and to the D rings 2 by fastening loops 3A.

To make this cloth most effective the large rings 1 are preferably made of harder material than the small rings 4 in order that a harder service may be performed by the rings 1 than will be performed by the rings 4.

Where the cloth is made in the shape as illustrated in Fig. 2, I make an outside rim 5 of rings similar to that illustrated at 4 in Fig. 1 and a central portion that is comprised of rings 8 and I secure the rim 5 and the central portion together by a plurality of links 6. The links 6 are secured together and to the inner line of rings of the rim 5 by links 7. The links 7 are made relatively coarse and large in order that they may be used for the scraping of pots and pans and other kitchen utensils and they are made more effective by folding the rim 5 over upon the central portion in order that the links 6 may be made available for abrasive purposes.

In the utilizing of the cloth as illustrated in Fig. 1 for the cleaning of pots and pans the outer rim section 4 is folded over on to the top of the central section to thereby make the central section 1 available for scraping pots, pans and the like, whereas, if table ware is to be cleaned by the same device, the folded over portion is utilized for contacting the surface of the dining room utensils that are to be cleaned. It will thus be seen that in either form of structure the finer and softer fabric may be used in the cleaning of ware that will not stand abuse, whereas, the coarse links that may be made of harder material are utilized for the actual cleaning of kitchen ware. Also the central portion in either case may be made of much harder material than that of the rim portion so that greater abuse may be imparted thereto. In the performing of the heavy duties of a dishcloth the links 6 are secured together at their corners by a multi-sided ring 9.

My device may be made of a single sheet of fabricated metal cloth or it may be made of a double sheet of metal cloth to form a pocket into which a bar of soap, a bar of scouring compound, or a bar of other saponaceous material may be placed to aid in the cleaning and polishing process for the materials to be reconditioned through the use of my new and improved dishcloth.

In Fig. 3 I have shown the central portion as being made of double thickness, as illustrated at 10 and 11 with one side of the edge being open to permit the passing of a bar of soap or other cleaning or scouring compound 12 therein. It is preferably made so that one of the sides as at 10, may be made of fine mesh material, whereas, the opposite side 11 may be made of coarser mesh, one of the sides of the mesh may be made of harder material than the other in order that the dual purpose of cleaning table ware and kitchen ware may be served.

While the form of mechanism herein shown and described is admirably adapted to fulfill the objects primarily stated, it is to be understood that it is not intended to confine the invention to the embodiment herein shown and described, as it is susceptible of embodiment in various forms, all coming within the scope of the claims which follow.

What I claim is:

1. A dishcloth made of woven metal fabric with the cloth being made of a central portion and an outer portion and with the central portion being made of two thicknesses to form a pocket and with the sides of the pocket being made of different sized mesh and of metal of different hardness.

2. A dishcloth made of woven metal fabric with the cloth being made of a central portion and an outer portion, and with the central portion being made of two thicknesses to form a pocket adapted to receive a bar of soap therein, with the sides of the pocket being made of mesh of different sizes.

LELLAH E. SHICK.